(12) United States Patent
Kadle et al.

(10) Patent No.: US 10,015,086 B2
(45) Date of Patent: Jul. 3, 2018

(54) MULTI GTM BASED ROUTING TO AVOID LATENCIES

(71) Applicant: Intuit Inc., Mountain View, CA (US)

(72) Inventors: Rajesh Kumar Kadle, Cupertino, CA (US); Mark Basler, Milpitas, CA (US); Granville B. Goza, IV, San Jose, CA (US); Miroslav S. Boussarov, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 78 days.

(21) Appl. No.: 15/142,741

(22) Filed: Apr. 29, 2016

(65) Prior Publication Data

US 2017/0317927 A1    Nov. 2, 2017

(51) Int. Cl.
| | | |
|---|---|---|
| *H04L 12/721* | (2013.01) |
| *G06F 17/30* | (2006.01) |
| *H04L 12/707* | (2013.01) |
| *H04L 29/12* | (2006.01) |
| *H04L 12/26* | (2006.01) |

(52) U.S. Cl.
CPC ........ *H04L 45/70* (2013.01); *G06F 17/30554* (2013.01); *H04L 43/0805* (2013.01); *H04L 45/22* (2013.01); *H04L 61/10* (2013.01)

(58) Field of Classification Search
None
See application file for complete search history.

(56) References Cited

U.S. PATENT DOCUMENTS

| | | | | |
|---|---|---|---|---|
| 6,795,820 B2* | 9/2004 | Barnett | ............. | G06F 17/30864 |
| 7,340,505 B2* | 3/2008 | Lisiecki | ............. | G06F 17/3089 |
| | | | | 370/227 |
| 7,472,178 B2* | 12/2008 | Lisiecki | ............. | G06F 17/3089 |
| | | | | 709/203 |
| 7,508,764 B2* | 3/2009 | Back | ....................... | H04L 43/00 |
| | | | | 370/235 |
| 7,574,499 B1* | 8/2009 | Swildens | ................ | G06F 9/505 |
| | | | | 709/202 |
| 7,702,947 B2* | 4/2010 | Peddada | ............. | H04L 41/0663 |
| | | | | 709/223 |
| 7,830,896 B2* | 11/2010 | Srivastava | ............. | H04L 45/00 |
| | | | | 370/392 |
| 7,904,541 B2* | 3/2011 | Swildens | ................ | G06F 9/505 |
| | | | | 709/202 |
| 8,243,589 B1 | 8/2012 | Trost et al. | | |
| 8,432,791 B1 | 4/2013 | Masters | | |

(Continued)

FOREIGN PATENT DOCUMENTS

WO    WO 2012/086916    6/2012

*Primary Examiner* — Gregory B Sefcheck
(74) *Attorney, Agent, or Firm* — Hawley Troxell Ennis & Hawley LLP; Philip McKay

(57) ABSTRACT

A method and system provides improved routing efficiency for users of a data management system. The data management system includes a plurality of global traffic managers, local traffic managers, and data centers that store user data. Each data center is related to a respective global traffic manager and a respective local traffic manager. When a user submits a request to access data stored in one of the data centers, the data management system identifies a primary data center from which the user will access the user data and routes the user request data to the global traffic manager related to the primary data center.

36 Claims, 3 Drawing Sheets

(56) References Cited

U.S. PATENT DOCUMENTS

| | | | |
|---|---|---|---|
| 8,484,656 B2* | 7/2013 | Raja | H04L 67/1012 |
| | | | 709/225 |
| 8,612,564 B2* | 12/2013 | Swildens | G06F 9/505 |
| | | | 709/202 |
| 9,032,488 B2* | 5/2015 | Lee | G06F 21/31 |
| | | | 709/217 |
| 9,264,486 B2* | 2/2016 | Joshi | H04L 67/10 |
| 9,268,621 B2* | 2/2016 | Horman | G06F 9/544 |
| 9,491,232 B2* | 11/2016 | Joshi | H04L 67/10 |
| 9,565,157 B2* | 2/2017 | Chhabra | H04L 61/1511 |
| 9,584,505 B2* | 2/2017 | Lee | G06F 21/31 |
| 9,596,122 B2* | 3/2017 | Hinton | H04L 41/00 |
| 9,705,895 B1* | 7/2017 | Gutzmann | H04L 63/14 |
| 9,749,242 B2* | 8/2017 | Parikh | H04L 41/5012 |
| 2012/0066394 A1* | 3/2012 | Revanuru | G06F 17/30286 |
| | | | 709/226 |
| 2012/0102220 A1 | 4/2012 | Hopmann et al. | |
| 2012/0134355 A1 | 5/2012 | Vendrow et al. | |
| 2014/0331014 A1* | 11/2014 | Liao | G06F 15/17306 |
| | | | 711/147 |
| 2015/0058467 A1* | 2/2015 | Douglas | G06Q 10/0631 |
| | | | 709/223 |
| 2015/0326665 A1 | 11/2015 | Carney et al. | |
| 2015/0341428 A1* | 11/2015 | Chauhan | H04L 69/16 |
| | | | 709/203 |
| 2016/0328222 A1* | 11/2016 | Arumugam | G06F 8/60 |

\* cited by examiner

MULTI GTM BASED ROUTING TO AVOID LATENCIES

BACKGROUND

Data service providers provide many services related to the storing of data for thousands or millions of customers around the world. Typically, such data is stored in multiple data centers. These data centers maybe located in different geographical areas. In homogenous data systems, each data center may store copies of the same data. When a user tries to access data, a heterogeneous configuration, a large system of routers and traffic managers is utilized for the request to the appropriate data center. The system of routers and traffic managers may be very complex. The complexity of the system can result in delays, service outages, and very high expenses for the data service providers. In situations in which all data centers host all of the data and are active to both reads and writes while multiple users are accessing the data, routing can become further complicated.

To help alleviate these problems, some heterogeneous data systems employ a global traffic manager to assist in routing user data requests to the appropriate data center. For example, when a user accesses the Internet from a personal computing device in order to access user data stored in one or more of the data centers, the user request may be directed to a default global traffic manager associated with one data center which then resolves the user request to a different data center at which that user's data is stored. Because the user request is by default resolved by a global traffic manager associated with a first data center before being 46569.0606.8079858.1 redirected to the correct data center, latency is introduced into the system. This latency results in the user accessing the data more slowly. Furthermore, when traffic among the data centers is inefficiently handled, this results in data access delays and possibly unsatisfied customers.

What is needed is a method and system for providing access to user data stored in one or more data centers more efficiently.

SUMMARY

Embodiments of the present disclosure address some of the shortcomings associated with traditional data management systems by providing methods and systems for providing improved routing efficiency for users of a data management system. In particular, a data management system in accordance with one embodiment includes plurality of data centers and a plurality of global traffic managers. Each global traffic manager is associated with a respective data center. The system further includes a plurality of local traffic managers each associated with a respective data center. Thus, each data center is associated with a respective global traffic manager and a local traffic manager. When a user of the data management systems seeks to access user data stored in one or more of the data centers, the user initiates a data access request, for instance by entering a URL and a web browser or with a service call. A request routing systems receives user request data corresponding to the user's data access request. The request routing system provides the user request data to a lookup service module of the data management system. The lookup service module analyzes the user request data and determines a primary data center at which the user will access the related user data. The lookup service module provides selection data to the request routing system. The selection data indicates the primary data center. The request routing system then routes the user request data to the global traffic manager that is associated with the primary data center. The global traffic manager then resolves the request data's hostname to an Internet protocol address. The user request data is then routed directly to the local traffic manager of the primary data center. In this way, the user request data is routed directly to a global traffic manager and a local traffic manager that are both associated with the primary data center from which the user will access the user data. This reduces latency compared to traditional systems because the user request data is directly provided to a global traffic manager associated with the primary data center instead of being provided to a default global traffic manager associated with a default data center before being passed to the different data center in which the user's data is actually stored. The data management system includes various components, databases, engines, modules, and/or data to support providing more efficient routing for users of a heterogeneous data management system, according to one embodiment.

In one embodiment, the selection data also indicates a secondary data center in addition to the primary data center. When the user request data is provided to the global traffic manager associated with the primary data center, the global traffic manager checks to see if the local traffic manager associated with the primary data center is able to handle the user's request to access user data. If the local traffic manager associated with the primary data center is unable to handle the user's request to access user data, then the global traffic manager associated with the primary data center resolves the hostname to an Internet protocol address of the secondary data center. The user request data is then routed to a local traffic manager associated with the secondary data center. Thus, in the event that the local traffic manager associated with the primary data center is overloaded or otherwise unable to handle the user's request, the user's request is still handled by a local traffic manager associated with the secondary data center.

In one embodiment, the data management system is a financial management system that manages one or more of investments, budgeting, retirement plans, payroll, tax return preparation, bank accounts, credit cards, financial transactions, or other types of financial matters. Users of the financial system have their financial data stored in one or more of a plurality of data centers in diverse locations. As users around the world access their data, the financial management system utilizes a respective global traffic manager and local traffic manager for each data center in order to manage traffic. When a user requests to access financial data, the financial system generates selection data indicating a primary data center. A global traffic manager associated with the primary data center then resolves the hostname to an Internet protocol address of a local traffic manager associated with the primary data center. The global traffic manager checks to see that the local traffic manager associated with the primary data center is available to route the user request data. If the local traffic manager associated with the primary data center is available, then the user request data is routed to the local traffic manager associated with primary data center. The local traffic manager associated with the primary data center then routes the user request data to the primary data center at which the user's financial data is stored. If the local traffic manager associated with the primary data center is too busy or otherwise unavailable, the global traffic manager resolves the user request data to an Internet protocol address of a local traffic manager associated with a secondary data center. The local traffic manager associated with the secondary data center then routes the user request data to the primary data center, thereby enabling the user to access the user's financial data.

In one embodiment, the selection data generated by the lookup service module includes an adjusted hostname specific to the primary data center. The request routing system uses the global traffic manager associated with the primary data center to resolve an Internet protocol address from the host name. The request routing system then routes the user request data to the local traffic manager associated with the primary data center based on the Internet protocol address. Alternatively, if the local traffic manager associated with the primary data center is not available, then the global traffic manager associated with the primary data center resolves a secondary Internet protocol address from the user request data. The secondary Internet protocol address causes the request routing system route the request data to a local traffic manager associated with secondary data center. In one embodiment, generating the hostname includes attaching a prefix to an original hostname.

In one embodiment, the selection data includes index data that indicates the primary data center.

A data management system in accordance with one or more embodiments provides global routing that is more efficient than in traditional systems by providing each data center with a respective global traffic manager and local traffic manager and assigning to each data access request made by a user a primary data center and routing the user request data associated with the data access request to the global traffic manager associated with the primary data center. The global traffic manager resolves to the Internet protocol address of a local traffic manager of the primary data center. The various embodiments of the disclosure can be implemented to improve the technical fields of user experience, data routing, services marketing, data collection, and data processing. Therefore, the various described embodiments of the disclosure and their associated benefits amount to significantly more than an abstract idea. In particular, by providing improved routing efficiency for users of a data management system, users can save money and time and can better manage their personal data.

Using the disclosed embodiments of a method and system for providing improved routing efficiency for users of a data management system, a method and system for providing improved routing efficiency more accurately and efficiently are provided. Therefore, the disclosed embodiments provide a technical solution to the long standing technical problems of reducing the burden on system routers, processors, storage, servers, and communication channels, as well as saving resources and money.

In addition, the disclosed embodiments of a method and system for providing improved routing efficiency for users of a data management system are also capable of dynamically adapting to the needs of users of data management systems. Consequently, the disclosed embodiments of a method and system for providing improved routing efficiency for users of a data management system also provide a technical solution to the long standing technical problem of static and inflexible data management systems.

The result is a much more accurate, adaptable, and robust, method and system for providing improved routing efficiency for users of a data management system, but thereby serves to bolster confidence in electronic data management systems. This, in turn, results in: less human and processor resources being dedicated to developing and implementing routing systems, i.e., fewer processing and memory storage assets; less memory and storage bandwidth being dedicated to buffering and storing user data and user request data; less communication bandwidth being utilized to transmit user data and user data requests.

The disclosed method and system for providing improved routing efficiency for users of a data management system does not encompass, embody, or preclude other forms of innovation in the area of data management systems. In addition, the disclosed method and system for providing improved routing efficiency for users of a data management system is not related to any fundamental economic practice, fundamental data processing practice, mental steps, or pen and paper based solutions, and is, in fact, directed to providing solutions to new and existing problems associated with data routing in data management systems. Consequently, the disclosed method and system for providing improved routing efficiency for users of a data management system, does not encompass, and is not merely, an abstract idea or concept.

Figure 1:
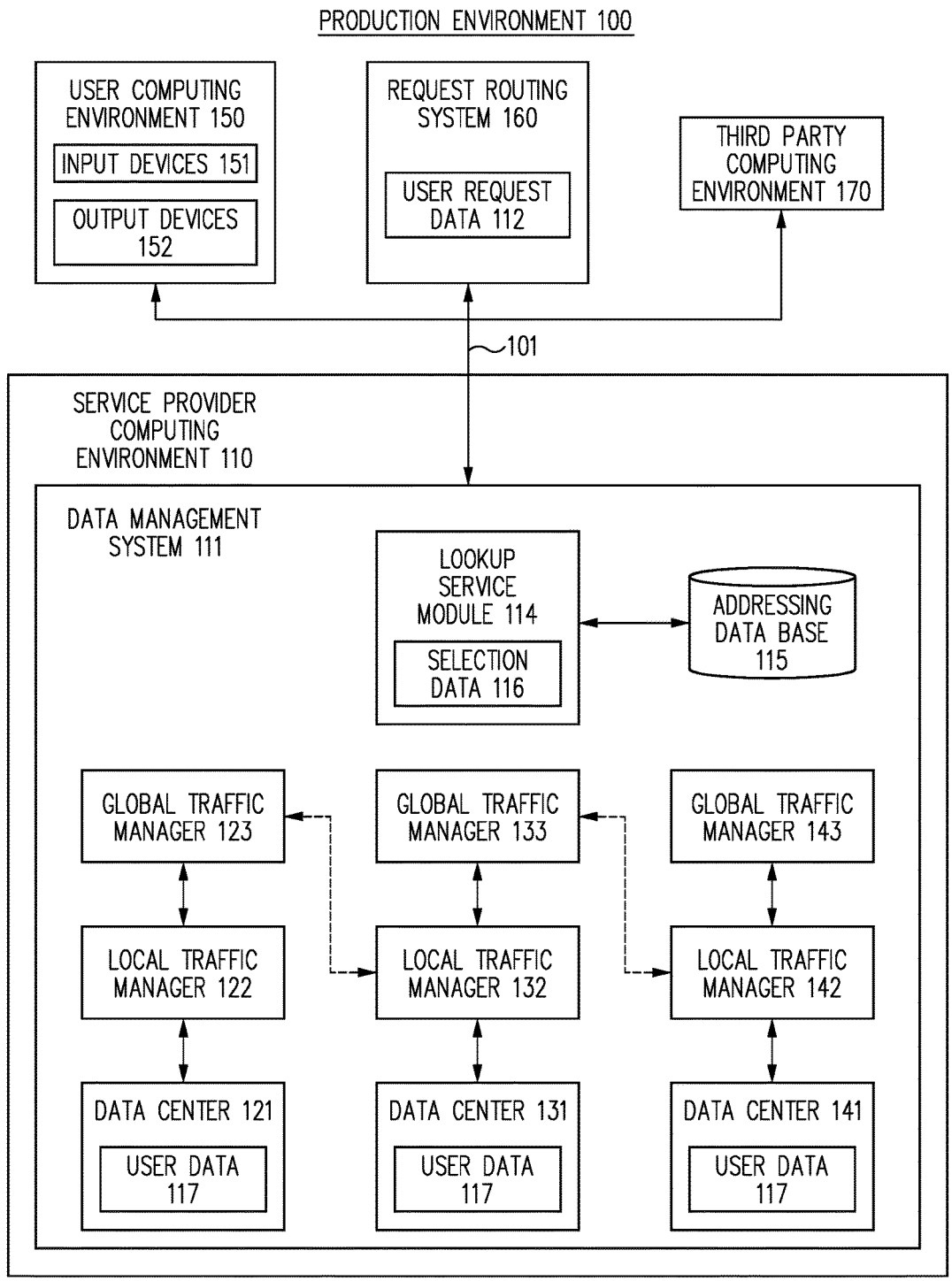
FIG. 1 is a block diagram of software architecture for providing improved routing efficiency for users of a data management system, in accordance with one embodiment.

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

Herein, the term "production environment" includes the various components, or assets, used to deploy, implement, access, and use, a given application as that application is intended to be used. In various embodiments, production environments include multiple assets that are combined, communicatively coupled, virtually and/or physically connected, and/or associated with one another, to provide the production environment implementing the application.

As specific illustrative examples, the assets making up a given production environment can include, but are not limited to, one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer, data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the terms "computing system", "computing device", and "computing entity", include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate an application.

In various embodiments, one or more cloud computing environments are used to create, and/or deploy, and/or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing, can be implemented as one or more virtual assets.

In one embodiment, two or more assets, such as computing systems and/or virtual assets, and/or two or more computing environments, are connected by one or more communications channels including but not limited to, Secure Sockets Layer communications channels and various other secure communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user" includes, but is not limited to, any party, parties, entity, and/or entities using, or otherwise interacting with any of the methods or systems discussed herein. For instance, in various embodiments, a user can be, but is not limited to, a person, a commercial entity, an application, a service, and/or a computing system.

As used herein, the term "relationship(s)" includes, but is not limited to, a logical, mathematical, statistical, or other association between one set or group of information, data, and/or users and another set or group of information, data, and/or users, according to one embodiment. The logical, mathematical, statistical, or other association (i.e., relationship) between the sets or groups can have various ratios or correlation, such as, but not limited to, one-to-one, multiple-to-one, one-to-multiple, multiple-to-multiple, and the like, according to one embodiment. As a non-limiting example, if the disclosed data management system determines a relationship between a first group of data and a second group of data, then a characteristic or subset of a first group of data can be related to, associated with, and/or correspond to one or more characteristics or subsets of the second group of data, or vice-versa, according to one embodiment. Therefore, relationships may represent one or more subsets of the second group of data that are associated with one or more subsets of the first group of data, according to one embodiment. In one embodiment, the relationship between two sets or groups of data includes, but is not limited to similarities, differences, and correlations between the sets or groups of data.

As used herein, the terms "interview" and "interview process" include, but are not limited to, an electronic, software-based, and/or automated delivery of multiple questions to a user and an electronic, software-based, and/or automated receipt of responses from the user to the questions, according to various embodiments.

As used herein, the term "global traffic manager" includes, but is not limited to virtual assets; server computing systems; switching systems; routers; hardware systems; communications systems; proxy systems; gateway systems; firewall systems; load balancing systems; or any devices that can be used to perform the processes and/or operations as described herein.

As used herein, the term "local traffic manager" includes, but is not limited to virtual assets; server computing systems; switching systems; routers; hardware systems; communications systems; proxy systems; gateway systems; firewall systems; load balancing systems; or any devices that can be used to perform the processes and/or operations as described herein.

Hardware Architecture

FIG. 1 illustrates a block diagram of a production environment 100 for providing improved routing efficiency for users of a data management system, according to one embodiment. Embodiments of the present disclosure provide methods and systems for providing improved routing efficiency for users of a data management system, according to one embodiment. In particular, embodiments of the present disclosure receive user request data related to a request from a user to access data stored in one or more data centers, analyze the user request data, and select a primary data center from which the user will access the user data. Each data center is associated with a respective global traffic manager and local traffic manager. The user request data is routed directly to the global traffic manager associated with the primary data center. The global traffic manager associated with the primary data center resolves an Internet protocol address from the user request data. The Internet protocol address is an Internet protocol address a local traffic manager associated with, or part of, the primary data center. The local traffic manager associated with the primary data center then routes the user request data within the primary data center. By passing the user request data to be resolved by a global traffic manager associated with the primary data center from which the user data will be accessed, the routing efficiency of the data management system is increased.

In addition, the disclosed method and system for providing improved routing efficiency for users of a data management system provides for significant improvements to the technical fields of electronic transaction data processing, data processing, data management, and user experience.

In addition, as discussed above, the disclosed method and system for providing improved routing efficiency for users of a data management system provides for the processing and storing of smaller amounts of data, i.e., more efficiently analyze only selected portions of image data; thereby eliminating unnecessary data analysis and storage. Consequently, using the disclosed method and system for providing improved routing efficiency for users of a data management system r results in more efficient use of human and non-human resources, fewer processor cycles being utilized, reduced memory utilization, and less communications bandwidth being utilized to relay data to, and from, backend systems and client systems, and various investigative systems and parties. As a result, computing systems are transformed into faster, more efficient, and more effective computing systems by implementing the method for providing improved routing efficiency for users of a data management system.

The production environment 100 includes a service provider computing environment 110, a user computing environment 150, a request routing system 160, a third party computing environment 170 for providing improved routing efficiency, according to one embodiment. The computing environments 110, 150, 160, and 170 are communicatively coupled to each other with one or more communication channels 101, according to one embodiment.

The service provider computing environment 110 represents one or more computing systems such as a server, a computing cabinet, and/or distribution center that is configured to receive, execute, and host one or more data management systems for access by one or more users, according to one embodiment. The service provider computing environment 110 represents data center computing environments, virtual asset computing environments (e.g., a cloud computing environment), or a hybrid between traditional data center computing environments and a virtual asset computing environments, according to one embodiment.

The service provider computing environment 110 includes a data management system 111, which is configured to provide improved routing efficiency for a user.

According to an embodiment, the data management system 111 receives user request data related to a request made by a user to access user data associated the user. The data management system 111 analyzes the user request data and generates selection data that indicates a primary data center from a plurality of data centers from which the user will access the user data. The data management system causes the user request data to be routed to a global traffic manager associated with the primary data center. The global traffic manager associated with the primary data center resolves from the user request data an Internet protocol address of a local traffic manager associated with the primary data center. The local traffic manager associated with the primary data center routes the user request data to the primary data center. If the local traffic manager associated with the primary data center is not available, the global traffic manager associated with the primary data center resolves a secondary Internet protocol address of a local traffic manager associated with a secondary data center. In this way, if the primary data center is inaccessible for one reason or another, the user can still access the user data via the local traffic manager associated with the secondary data center.

In one embodiment, the data management system 111 includes a plurality of data centers 121, 131, and 141. The data centers 121, 131, 141 can be located in diverse geographic locations. For example, the data centers 121, 131, and 141 can be located in different cities, different states, different provinces, different countries, different continents, or at different locations within the same city, etc.

Each data center stores user data 117. The user data 117 is data related to various users of the data management system 111. The data can include personal data such as financial data, business data, data related to websites associated with the users and hosted by the data management system 111, or many other kinds of data related to users of the data management system 111. While each data center 121, 131, 141 is shown as storing user data 117, the user data 117 stored in each data center 121, 131, 141 can be identical, unique, or overlapping.

In homogenous data centers, multiple data centers will store the same data. While this can include improved accessibility and security, i.e. a data loss at one data center will not result in the total loss of any user's data because that data is also stored at the other data centers, such homogenous data storage can be very expensive as the amount of resources needed to store any user's data is multiplied by the number of homogenous data centers.

In heterogeneous data centers, the data centers do not store identical data. Instead, each data center stores a subset of the total data. For example, the data related to a first group of users may be stored at a first data center, the data related to a second group of users may be stored at a second data center, and so on. Additionally, there may be some overlap in the data stored at each data center. For example, a given user may have all or a portion of her related data stored in two or more data centers. Thus, if a user is unable to access the data from a primary data center, a heterogeneous data management system may still be able to access that user's data and a secondary data center. Thus, while each data center does not store identical data, there is some overlap between what is stored at various data centers in a heterogeneous data management system. Additionally, some data may be available in all data centers.

The data management system 111 includes a plurality of local traffic managers 122, 132, 142. Each of the local traffic managers 122, 132, 142 is associated with a respective data center 121, 131, 141. The local traffic manager 122 is associated with the data center 121. The local traffic manager 132 is associated with the data center 131. The local traffic manager 142 is associated with the data center 141. Thus, each data center 121, 131, 141 has associated therewith a dedicated local traffic manager 122, 132, 142. In one embodiment, each local traffic manager 122, 132, 142 is deployed in the respective data center 121, 131, 141 with which it is associated.

In one embodiment, each of the local traffic managers 122, 132, 142 includes one or more routers that route user requests to the respective data centers 121, 131, 141. For example, if the user request to access data from the data center 121, the local traffic manager 122 can route the request properly such that the user is able to access the proper user data stored at particular addresses within the data center 121.

In one embodiment, each of the local traffic managers 122, 132, 142 is part of an F5 network BiG-IP platform. Each local traffic manager 122, 132, 142 can augment connections between users and the data centers 121, 131, 141. The local traffic managers 122, 132, 142 assist in balancing traffic loads to and from the data centers 121, 131, 141. The local traffic managers 122, 132, 142 can make decisions regarding availability of the data centers 121, 131, 141. Each local traffic manager 122, 132, 142 can be local to the respective data center 121, 131, 141 with which it is associated. In one embodiment, each local traffic manager can also manage traffic to and from the data centers 121, 131, 141 with which it is not directly associated. Each local traffic manager 122, 132, 142 can manage traffic to and from one of the data centers 121, 131, 141 with which it is not primarily associated if the local traffic manager typically associated with that data center is unavailable. In one embodiment, the local traffic managers can include Virtual Internet Protocol (VIP) functionality.

The data management system 111 also includes a plurality of global traffic managers 123, 133, 143. Each of the global traffic managers 123, 133, 143 is associated with a respective data center 121, 131, 141. The global traffic manager 123 is associated with the data center 121. The global traffic manager 133 is associated with the data center 131. The local traffic manager 143 is associated with the data center 141. Thus, each data center 121, 131, 141 has associated therewith a dedicated global traffic manager 123, 133, 143.

In one embodiment, the global traffic managers 123, 133, 143 are able to make load-balancing decisions for data centers in diverse places. The traffic from the data centers 121, 131, 141 does not flow through the global traffic managers 123, 133, 143. The global traffic managers 123, 133, 143 are intelligent name resolvers that can intelligently resolve host names to Internet protocol addresses. Thus, the global traffic managers 123, 133, 143 can resolve Internet protocol addresses from user requests, allowing the local traffic managers to then route the user request. In particular, once the global traffic manager has resolved a name to an Internet protocol address, the global traffic manager directs the user request including the now resolved Internet protocol address, to the local traffic manager 122, 132, 142 associated with that global traffic manager 123, 133, 143. Alternatively, if the local traffic manager 122, 132, 142 with which the global traffic manager 123, 133, 143 is primarily associated is not available, the global traffic manager 123, 133, 143 can resolve a secondary Internet protocol address from the host name. The secondary Internet protocol address directs the user data request to a secondary local traffic manager 122, 132, 142, as represented by the dashed lines in FIG. 1. The global traffic managers 123, 133, 143 can manage how the local traffic managers 122, 132, 142 handle traffic to and from the data centers 121, 131, 141. The global traffic managers 123, 133, 143 can include Wide Internet Protocol (WIP) functionality.

In one embodiment, the data management system 111 includes a lookup service module 114. The lookup service module 114 can assist in determining in which of the data centers 121, 131, 141 a particular user's data is stored, or from which data center the user should access his data.

In one embodiment, the data management system 111 includes an addressing database 115 that stores data related to the locations of each user's data and/or related to the data center from which each user should access the user data 117. Thus, in determining in which data center 121, 131, 141 the user's data is stored, the lookup service module 114 can check with the addressing database 115 in order to ascertain the location of the user's data.

In one embodiment, the data management system 111 interfaces with the request routing system 160. The request routing system can include a service that assists in routing user requests for data access and delivering the data to the user. The request routing system 160 can post static content in locations near users. For example, if a user in Australia attempts to access a webpage hosted on the server in Canada, if the webpage has previously been accessed by another user in Australia, the request routing system 160 will have cached a static version of the webpage on the server near the user. Thus, when the new user from Australia tends to access the webpage, the request routing system 160 routes the user to the cached version of the webpage. The request routing system 160 can be very useful in quickly and efficiently routing data access requests and content delivery between users and remote servers around the world.

In one embodiment, when a user makes a data access request via the Internet, the request routing system 160 intercepts the request and queries the lookup service module 114 as to where the user's data is located. The lookup service module 114 provides to the request routing system 160 information, such as indicating a primary data center 121, 131, or 141 at which the user's data is stored. The request routing system 160 provides the user request to the global traffic manager 123, 133, or 143 associated with the primary data center 121, 131, or 141. The global traffic manager 123, 133, or 143 associated with the primary data center 121, 131, or 141 resolves an Internet protocol address from the requested data. The user request data is then routed to the local traffic manager 122, 132, or 142 associated with the primary data center. The local traffic manager 122, 132, or 142, routes the user's request to the proper address within the primary data center 121, 131, or 141. The data is then accessed and provided to the user via the request routing system 160.

In one embodiment, the user computing environment 150 is a computing environment associated with a particular user. The user computing environment 150 includes input devices such as a mouse, a touchpad, a touchscreen, a microphone, a light pen, a keyboard, or other input devices by which the user can provide input to the user computing environment 150. The user computing environment 150 also includes output devices 152. The output devices can include a display, a touchscreen, a speaker, a printer, the fax device, or the like.

In one embodiment, a user of the data management system 111 uses the user computing environment 150 to make a request to access the user's data stored in the data management system 111. In particular, the user uses the input devices 151 to input an Internet protocol address, to click on a link on a webpage hosted by the data management system 111, or another way attempts to access the user's data stored by the data management system 111. The user's request is first received by the request routing system 160.

The request routing system 160 receives user request data 112 related to the user's request to access the user's data stored and/or managed by the data management system 111. The request routing system 160 provides the user request data 112, or a portion of the user request data 112 to the lookup service module 114 in order to determine which data center 121, 131, or 141 the user's data is stored. The lookup service module 114 analyzes the user request data 112 and generates selection data 116. The selection data 116 identifies a primary data center among the data centers 121, 131, or 141. Based on the selected data 116, the request routing system 160 routes the user request data 112 to the global traffic manager 123, 133, or 143 associated with the primary data center 121, 131, or 141. The global traffic manager 123 resolves Internet protocol address data from the user request data 112 and the selected data 116 and provides the resolved Internet protocol address to the request routing system 160. The request routing system then routes the user request data 112 to the local traffic manager 122, 132, or 142 associated with the primary data center 121, 131, or 141. The local traffic manager 122, 132, or 142 associated with the primary data center 121, 131, or 141 routes the user request data 112 to the appropriate address within the primary data center 121, 131, or 141. The user is then able to access the user data 117. The content accessed from the user data 117 by the user is provided to the user via the request routing system 160.

In one embodiment, the selection data 116 generated by the lookup service module 114 includes an adjusted hostname or URL specific to the primary data center 121, 131, or 141. The request routing system 160 then routes the user request data to the global traffic manager 123, 133, or 143 associated with the primary data center 121, 131, or 141 based on the adjusted Internet protocol address. The global traffic manager 123, 133, or 143 associated with the primary data center 121, 131, or 141 then resolves the hostname into an Internet protocol address that directs the user request data 112 to the local traffic manager 122, 132, or 142 associated with the primary data center 121, 131, or 141.

In one example, if the user enters the fictional URL http://genericcompanyname.com to access his data, the user request data 112 will include the URL entered by the user. The user request data 112 may also include the user's Internet protocol address, a username or password associated with the user, or other profile data that identifies the user. The request routing system 160 provides the user request data 112 to the lookup service module 114 in order to determine where the user request data 112 should be routed. The lookup service module determines, based on the user request data 112, that the user's data is stored in data center 121, or that the user should access the user data from the data center 121. The lookup service module 114 generates selection data 116 that identifies that the data center 121 is the primary data center. The lookup service module 114 adjusts the user request data 112 based on the selection data 116 to include the URL http://datacenter121.genericcompanyname.com. This causes the request routing system 160 to pass the user request data 112 to the global traffic manager 123 associated with the primary data center 121. The global traffic manager 123 then resolves an Internet protocol address from the host name or URL. The global traffic manager 123 provides the resolved Internet protocol address to the request routing system 160. The global traffic manager 123 passes the resolved Internet protocol address to the request routing system 160. The request routing system 160 routes the user request data 112 to the local traffic manager 122 associated with the primary data center 121 based on the Internet protocol address. The local traffic manager 122 routes the user request data to or within the data center 121. The user is then able to access the user data 117 stored in the data center 121. Thus, in one embodiment, the data management system 111 assists the request routing system 160 in routing the user request data by prepending to the URL a prefix specific to the primary data center.

In one embodiment, if the local traffic manager associated with the primary data center is not available, then the global traffic manager associated with the primary data center resolves a secondary Internet protocol address of a local traffic manager associated with a secondary data center. The dashed lines connecting the global traffic manager 123 to the local traffic manager 132, and the global traffic manager 133 to the local can include traffic manager 142 and denote the ability of the global traffic managers 123, 133, and 143 to resolve an Internet protocol address of a secondary local traffic manager 122, 132, or 142 with which the global traffic manager 123, 133, or 143 is not directly associated.

In one embodiment, the data management system 111 is a financial management system that manages one or more of finances, investments, budgeting, retirement plans, payroll, tax return preparation, bank accounts, credit cards, financial transactions, or other types of financial matters. Users of the financial system have their financial data stored in one or more of a plurality of data centers in diverse locations. The user data 117 can include one or more of payroll data, budgeting data, retirement data, bank account data, credit card data, financial transaction data, home address data, business address data tax return preparation data, social security numbers, driver's license numbers, web traffic data, investment data, retirement plan data, or other types of finance related data. In one embodiment, the financial system can gather data from the third-party computing environment 170. The third-party computing environment 170 can include one or more third-party databases, public databases, social media databases, government databases, or other databases from which the financial system can gather data related to the users of the financial system.

In one embodiment the data management system 111 can include webpage hosting and/or development system. The webpage hosting system can store data related to customers of the webpage hosting system. For example, the data can include data related to the webpages of the customers.

Embodiments of the present disclosure address some of the shortcomings associated with traditional data management systems that do not efficiently route user request data related to users of a data management system. A data management system in accordance with one or more embodiments provides improved routing efficiency to users of the data management system. The various embodiments of the disclosure can be implemented to improve the technical fields of user experience, data routing, services marketing, data collection, and data processing. Therefore, the various described embodiments of the disclosure and their associated benefits amount to significantly more than an abstract idea. In particular, by providing each data center with a respective global traffic manager and local traffic manager, and assigning to each user request data a primary data center, system resources are used more efficiently and users can save money and time.

Process

Figure 2:
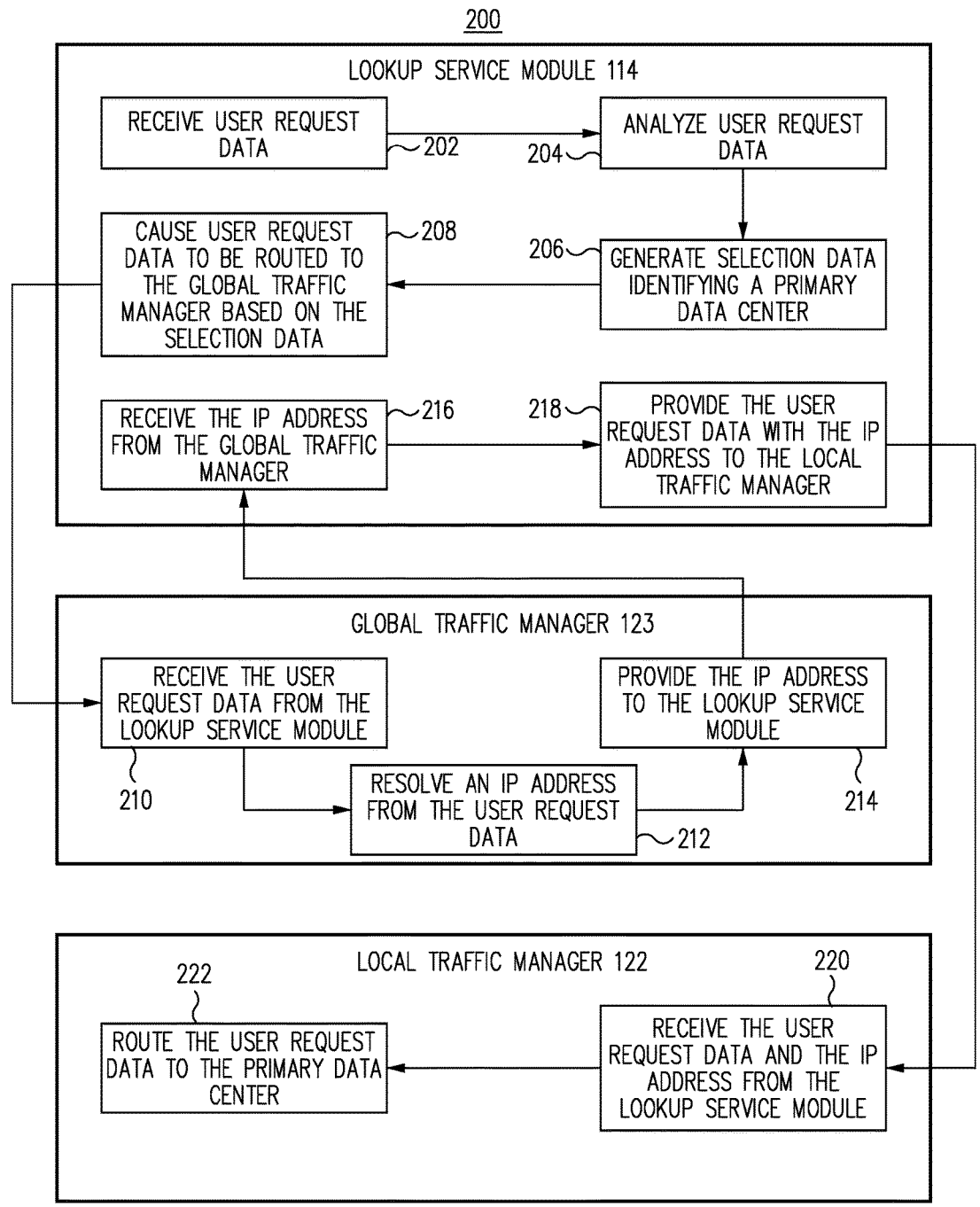
FIG. 2 is a block diagram of a process for providing improved routing efficiency for users of a data management system, in accordance with one embodiment.

FIG. 2 illustrates a functional flow diagram of a process 200 for providing improved routing efficiency to a user of data management system, in accordance with one embodiment.

At block 202, the lookup service module 114 receives user request data related to a request of the user to access the user data, according to one embodiment. From block 202 the process proceeds to block 204.

At block 204 the lookup service module 114 analyzes the user request data, according to one embodiment. From block 204, the process proceeds to block 206.

At block 206, the lookup service module 114 generates selection data identifying a primary data center from a plurality of data centers, according to one embodiment. From block 206, the process proceeds to block 208.

At block 208, the lookup service module 114 causes the user request data to be routed to a global traffic manager 123 associated with the primary data center, according to one embodiment. From block 208, the process proceeds to block 210

At block 210, the global traffic manager 123 related to the primary data center receives the user request data, according to one embodiment. From block 210, the process proceeds to block 212.

At block 212, the global traffic manager 123 resolves an Internet protocol address from the user request data, according to one embodiment. From block 212, the process proceeds to block 214.

At block 214, the global traffic manager 123 provides the user request data with the Internet protocol to the lookup service module 114, according to one embodiment. From block 214, the process proceeds to block 216.

At block 216 the lookup service module 114 receives the Internet protocol address from the global traffic manager 123, according to one embodiment. From block 216, the process proceeds to block 218.

At block 218, the lookup service module 114 provides the user request data with the Internet protocol address to the local traffic manager 122, according to one embodiment. From block 218, the process proceeds to block 220.

At block 220, the local traffic manager 122 receives the user request data and the Internet protocol address from the lookup service module, according to one embodiment. From block 220, the process proceeds to block 222.

At block 222, the local traffic manager 122 routes the user request data to the primary data center based on the Internet protocol address, according to one embodiment.

Although a particular sequence is described herein for the execution of the process 200, other sequences and steps can also be implemented.

In one embodiment, a request routing system 160 performs some of the steps associated with the lookup service module 114 in the process 200. For example, the request routing system 160 can provide the user request data to the lookup service module 114 prior to 202. At 208, the lookup service module 114 can provide the selection data to the request routing system 160. The request routing system 160 can provide the user request data with the selection data to the global traffic manager 123. After the global traffic manager 123 has resolved the Internet protocol address, the global traffic manager 123 can provide the Internet protocol address to the request routing system 160. The request routing systems 160 can then route the user request data to the local traffic manager 122, according to one embodiment.

Figure 3:
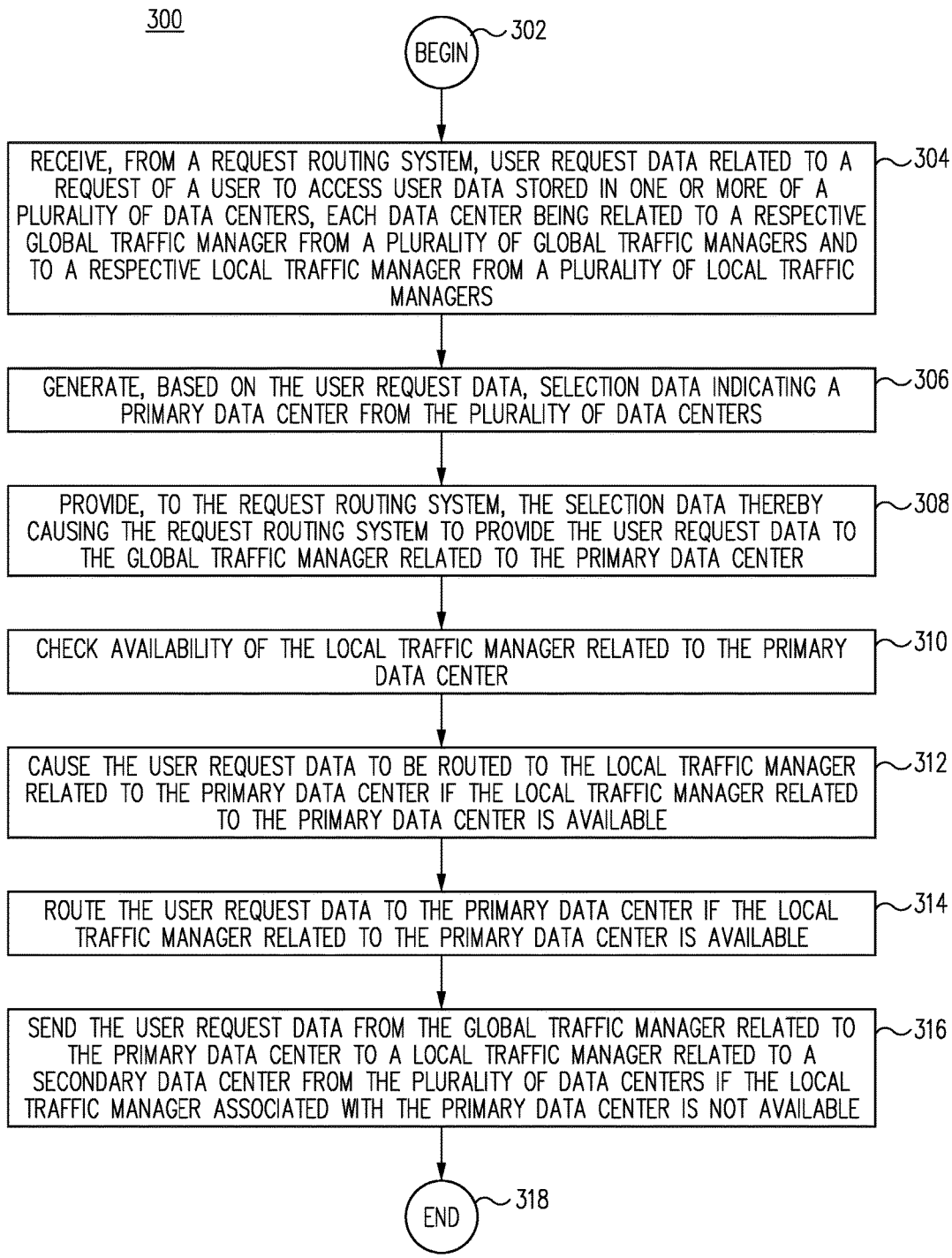
FIG. 3 is a flow diagram of a process for providing improved routing efficiency for users of a data management system, in accordance with one embodiment.

FIG. 3 illustrates a flow diagram of a process 300 for providing improved routing efficiency for a user of a data management system, according to various embodiments.

In one embodiment, process 300 for providing improved routing efficiency for a user of a data management system begins at BEGIN 302 and process flow proceeds to RECEIVE, FROM A REQUEST ROUTING SYSTEM, USER REQUEST DATA RELATED TO A REQUEST OF A USER TO ACCESS USER DATA STORED IN ONE OR MORE OF A PLURALITY OF DATA CENTERS, EACH DATA CENTER BEING RELATED TO A RESPECTIVE GLOBAL TRAFFIC MANAGER FROM A PLURALITY OF GLOBAL TRAFFIC MANAGERS AND TO A RESPECTIVE LOCAL TRAFFIC MANAGER FROM A PLURALITY OF LOCAL TRAFFIC MANAGERS 304.

In one embodiment, at RECEIVE, FROM A REQUEST ROUTING SYSTEM, USER REQUEST DATA RELATED TO A REQUEST OF A USER TO ACCESS USER DATA STORED IN ONE OR MORE OF A PLURALITY OF DATA CENTERS, EACH DATA CENTER BEING RELATED TO A RESPECTIVE GLOBAL TRAFFIC MANAGER FROM A PLURALITY OF GLOBAL TRAFFIC MANAGERS AND TO A RESPECTIVE LOCAL TRAFFIC MANAGER FROM A PLURALITY OF LOCAL TRAFFIC MANAGERS 304 process 300 for providing improved routing efficiency for a user of a data management system receives, from a request routing system, user request data related to a request of a user to access user data stored in one or more of a plurality of data centers, each data center being related to a respective global traffic manager from a plurality of global traffic managers and to a respective local traffic manager from a plurality of local traffic managers.

In one embodiment, once process 300 for providing improved routing efficiency for a user of a data management system receives, from a request routing system, user request data related to a request of a user to access user data stored in one or more of a plurality of data centers, each data center being related to a respective global traffic manager from a plurality of global traffic managers and to a respective local traffic manager from a plurality of local traffic managers at RECEIVE, FROM A REQUEST ROUTING SYSTEM, USER REQUEST DATA RELATED TO A REQUEST OF A USER TO ACCESS USER DATA STORED IN ONE OR MORE OF A PLURALITY OF DATA CENTERS, EACH DATA CENTER BEING RELATED TO A RESPECTIVE GLOBAL TRAFFIC MANAGER FROM A PLURALITY OF GLOBAL TRAFFIC MANAGERS AND TO A RESPECTIVE LOCAL TRAFFIC MANAGER FROM A PLURALITY OF LOCAL TRAFFIC MANAGERS 304 process flow proceeds to GENERATE, BASED ON THE USER REQUEST DATA, SELECTION DATA INDICATING A PRIMARY DATA CENTER FROM THE PLURALITY OF DATA CENTERS 306.

In one embodiment, at GENERATE, BASED ON THE USER REQUEST DATA, SELECTION DATA INDICATING A PRIMARY DATA CENTER FROM THE PLURALITY OF DATA CENTERS 306, process 300 for providing improved routing efficiency for a user of a data management system generates, based on the user request data, selection data indicating a primary data center from the plurality of data centers.

In one embodiment, once process 300 for providing improved routing efficiency for a user of a data management system generates, based on the user request data, selection data indicating a primary data center from the plurality of data centers at GENERATE, BASED ON THE USER REQUEST DATA, SELECTION DATA INDICATING A PRIMARY DATA CENTER FROM THE PLURALITY OF DATA CENTERS 306, process flow proceeds to PROVIDE, TO THE REQUEST ROUTING SYSTEM, THE SELECTION DATA THEREBY CAUSING THE REQUEST ROUTING SYSTEM TO PROVIDE THE USER REQUEST DATA TO THE GLOBAL TRAFFIC MANAGER RELATED TO THE PRIMARY DATA CENTER 308.

In one embodiment, at PROVIDE, TO THE REQUEST ROUTING SYSTEM, THE SELECTION DATA THEREBY CAUSING THE REQUEST ROUTING SYSTEM TO PROVIDE THE USER REQUEST DATA TO THE GLOBAL TRAFFIC MANAGER RELATED TO THE PRIMARY DATA CENTER 308, process 300 for providing improved routing efficiency for a user of a data management system provides, to the request routing system, the selection data thereby causing the request routing system to provide the user request data to the global traffic manager related to the primary data center, according to one embodiment.

In one embodiment, once process 300 for providing improved routing efficiency for a user of a data management system provides, to the request routing system, the selection data thereby causing the request routing system to provide the user request data to the global traffic manager related to the primary data center at PROVIDE, TO THE REQUEST ROUTING SYSTEM, THE SELECTION DATA THEREBY CAUSING THE REQUEST ROUTING SYSTEM TO PROVIDE THE USER REQUEST DATA TO THE GLOBAL TRAFFIC MANAGER RELATED TO THE PRIMARY DATA CENTER 308, process flow proceeds to CHECK AVAILABILITY OF THE LOCAL TRAFFIC MANAGER RELATED TO THE PRIMARY DATA CENTER 310.

In one embodiment, at CHECK AVAILABILITY OF THE LOCAL TRAFFIC MANAGER RELATED TO THE PRIMARY DATA CENTER 310 the process 300 checks availability of the local traffic manager related to the primary data center.

In one embodiment, once process 300 checks availability of the local traffic manager related to the primary data center at CHECK AVAILABILITY OF THE LOCAL TRAFFIC MANAGER RELATED TO THE PRIMARY DATA CENTER 310, process flow proceeds to CAUSE THE USER REQUEST DATA TO BE ROUTED TO THE LOCAL TRAFFIC MANAGER RELATED TO THE PRIMARY DATA CENTER IF THE LOCAL TRAFFIC MANAGER RELATED TO THE PRIMARY DATA CENTER IS AVAILABLE 312.

In one embodiment, at CAUSE THE USER REQUEST DATA TO BE ROUTED TO THE LOCAL TRAFFIC MANAGER RELATED TO THE PRIMARY DATA CENTER IF THE LOCAL TRAFFIC MANAGER RELATED TO THE PRIMARY DATA CENTER IS AVAILABLE 312 the process 300 for providing improved routing efficiency for a user of a data management system causes the user request data to be routed to the local traffic manager related to the primary data center if the local traffic manager related to the primary data center is available.

In one embodiment, once the process 300 for providing improved routing efficiency for a user of a data management system causes the user request data to be routed to the local traffic manager related to the primary data center if the local traffic manager related to the primary data center is available at CAUSE THE USER REQUEST DATA TO BE ROUTED TO THE LOCAL TRAFFIC MANAGER RELATED TO THE PRIMARY DATA CENTER IF THE LOCAL TRAFFIC MANAGER RELATED TO THE PRIMARY DATA CENTER IS AVAILABLE 312, process flow proceeds to ROUTE THE USER REQUEST DATA TO THE PRIMARY DATA CENTER IF THE LOCAL TRAFFIC MANAGER RELATED TO THE PRIMARY DATA CENTER IS AVAILABLE 314.

In one embodiment, at ROUTE THE USER REQUEST DATA TO THE PRIMARY DATA CENTER IF THE LOCAL TRAFFIC MANAGER RELATED TO THE PRIMARY DATA CENTER IS AVAILABLE 314 the process 300 for providing improved routing efficiency for a user of a data management system routes the user request data to the primary data center if the local traffic manager related to the primary data center is available.

In one embodiment, once the process 300 for providing improved routing efficiency for a user of a data management system routes the user request data to the primary data center if the local traffic manager related to the primary data center is available at ROUTE THE USER REQUEST DATA TO THE PRIMARY DATA CENTER IF THE LOCAL TRAFFIC MANAGER RELATED TO THE PRIMARY DATA CENTER IS AVAILABLE 314, process flow proceeds to SEND THE USER REQUEST DATA FROM THE GLOBAL TRAFFIC MANAGER RELATED TO THE PRIMARY DATA CENTER TO A LOCAL TRAFFIC MANAGER RELATED TO A SECONDARY DATA CENTER FROM THE PLURALITY OF DATA CENTERS IF THE LOCAL TRAFFIC MANAGER ASSOCIATED WITH THE PRIMARY DATA CENTER IS NOT AVAILABLE 316.

In one embodiment, at SEND THE USER REQUEST DATA FROM THE GLOBAL TRAFFIC MANAGER RELATED TO THE PRIMARY DATA CENTER TO A LOCAL TRAFFIC MANAGER RELATED TO A SECONDARY DATA CENTER FROM THE PLURALITY OF DATA CENTERS IF THE LOCAL TRAFFIC MANAGER ASSOCIATED WITH THE PRIMARY DATA CENTER IS NOT AVAILABLE 316 the process 300 for providing improved routing efficiency for a user of a data management system sends the user request data from the global traffic manager related to the primary data center to a local traffic manager related to a secondary data center from the plurality of data centers if the local traffic manager associated with the primary data center is not available.

In one embodiment, once the process 300 for providing improved routing efficiency for a user of a data management system sends the user request data from the global traffic manager related to the primary data center to a local traffic manager related to a secondary data center from the plurality of data centers if the local traffic manager associated with the primary data center is not available at SEND THE USER REQUEST DATA FROM THE GLOBAL TRAFFIC MANAGER RELATED TO THE PRIMARY DATA CENTER TO A LOCAL TRAFFIC MANAGER RELATED TO A SECONDARY DATA CENTER FROM THE PLURALITY OF DATA CENTERS IF THE LOCAL TRAFFIC MANAGER ASSOCIATED WITH THE PRIMARY DATA CENTER IS NOT AVAILABLE 316, process flow proceeds to END 318

In one embodiment, at END 318 the process for providing improved routing efficiency for a user of a data management system is exited to await new data and/or instructions. As noted above, the specific illustrative examples discussed above are but illustrative examples of implementations of embodiments of the method or process for providing improved routing efficiency for a user of a data management system. Those of skill in the art will readily recognize that other implementations and embodiments are possible. Therefore, the discussion above should not be construed as a limitation on the claims provided below.

In one embodiment, a method provides reduced routing latency for a data management system. The method includes receiving, from a request routing system, user request data related to a request of a user to access user data stored in one or more of a plurality of data centers. Each data center is related to a respective global traffic manager from a plurality of global traffic managers and to a respective local traffic manager from a plurality of local traffic managers. The method includes generating, based on the user request data, selection data indicating a primary data center from the plurality of data centers. The method also includes providing, to the request routing system, the selection data thereby causing the request routing system to provide the user request data to the global traffic manager related to the primary data center, checking availability of the local traffic manager related to the primary data center, and causing the user request data to be routed to the local traffic manager related to the primary data center if the local traffic manager related to the primary data center is available. The method further includes routing the user request data to the primary data center if the local traffic manager related to the primary data center is available and sending the user request data from the global traffic manager related to the primary data center to a local traffic manager related to a secondary data center from the plurality of data centers if the local traffic manager associated with the primary data center is not available.

In one embodiment, a system provides improved routing efficiency for a data management system. The system includes at least one processor and at least one memory coupled to the at least one processor, the at least one memory having stored therein instructions which, when executed by any set of the one or more processors, performs a process. The process includes receiving, with a lookup service module of a computing system, user request data from a request routing system. The user request data is related to a request of a user to access user data stored in one or more of a plurality of data centers. Each data center is related to a respective global traffic manager from a plurality of global traffic managers and to a respective local traffic manager from a plurality of local traffic managers. The process includes generating, with the lookup service module, selection data based on the user request data, the selection data indicating a primary data center from the plurality of data centers and causing the request routing system to provide the user request data to the global traffic manager related to the primary data center by providing, with the lookup service module, the selection data to the request routing system. The process further includes checking, with the global traffic manager related to the primary data center, an availability of the local traffic manager related to the primary data center, causing the user request data to be routed to the local traffic manager related with the primary data center if the local traffic manager related to the primary data center is available. The process also includes routing the user request data to the primary data center if the local traffic manager related to the primary data center is available and sending the user request data from the global traffic manager related to the primary data center to a local traffic manager related to a secondary data center from the plurality of data centers if the local traffic manager associated with the primary data center is not available.

In one embodiment, a non-transitory computer-readable medium has a plurality of computer-executable instructions which, when executed by a processor, perform a method for providing improved routing efficiency for a heterogeneous data management system. The instructions include a plurality of local traffic managers, a plurality of global traffic managers, and a plurality of data centers each associated with a respective local traffic manager and a respective global traffic manager. The instructions further include a lookup service module configured to receive user request data related to a request of a user to access data stored in one or more of the data centers, to determine a primary data center from the plurality of data centers, to generate selection data identifying the primary data center, and to provide the user request data with the selection data to global traffic manager associated with the primary data center.

In one embodiment, a method provides reduced routing latency for a data management system. The method includes receiving user request data related to a request of a user to access user data stored in one or more of a plurality of data centers. Each data center is related to a respective global traffic manager from a plurality of global traffic managers and to a respective local traffic manager from a plurality of local traffic managers. The method also includes causing the user request data to be routed to a global traffic manager related to a primary data from the plurality of data centers by generating, based on the user request data, selection data indicating the primary data center. The method further includes sending the user request data from the global traffic manager related to the primary data center to the local traffic manager related to the primary data center and routing the user request data from the local traffic manager related to the primary center to the primary data center.

In one embodiment, a system provides improved routing efficiency for a heterogeneous data management system. The system includes at least one processor and at least one memory coupled to the at least one processor, the at least one memory having stored therein instructions which, when executed by any set of the one or more processors, perform a process. The process includes receiving, with a lookup service module of a computing system, user request data related to a request of a user to access user data stored in one or more of a plurality of data centers. Each data center is related to a respective global traffic manager from a plurality of global traffic managers and to a respective local traffic manager from a plurality of local traffic managers. The process also includes causing, with the lookup service module, the user request data to be routed to a global traffic manager related to a primary data center from the plurality of data centers by generating, based on the user request data, selection data indicating the primary data center. The process further includes sending, with the global traffic manager related to the primary data center, the user request data to the local traffic manager related to the primary data center and routing the user request data from the local traffic manager related to the primary center to the primary data center.

As discussed in more detail above, using the above embodiments, with little or no modification and/or input, there is considerable flexibility, adaptability, and opportunity for customization to meet the specific needs of various parties under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A method for providing reduced routing latency for heterogeneous data centers, the method comprising:
    receiving, at a lookup service from a request routing system, user request data related to a request of a user to access user data stored in one of a plurality of data centers, the user data being business or financial data of the user, each data center being a coupled to its own respective global traffic manager of a plurality of global traffic managers and also coupled to its own respective local traffic manager of a plurality of local traffic managers;
    retrieving, by the lookup service from an addressing database, addressing data indicating a primary data center having user data of the user;
    generating, at the lookup service based on the user request data, selection data including the addressing data indicating a primary data center of the plurality of data centers, the indicated primary data center being a data center having the user data associated with the user request data;
    providing, by the lookup service to the request routing system responsive to receipt of the user request data from the request routing system, the selection data;
    providing, by the request routing system responsive to receiving the selection data, the user request data to the global traffic manager coupled to the indicated primary data center;
    checking by the global traffic manager coupled to the indicated primary data center, availability of the local traffic manager coupled to the indicated primary data center;
    if the local traffic manager coupled to the indicated primary data center is available:
        causing the user request data to be routed to the local traffic manager coupled to the indicated primary data center; and
    if the local traffic manager coupled to the primary data center is not available:
        sending the user request data from the global traffic manager coupled to the indicated primary data center to a local traffic manager coupled to a secondary data center from the plurality of data centers.

2. The method of claim 1, wherein the user request data includes a URL.

3. The method of claim 2, wherein the selection data causes the request routing system to attach to the user request data an adjusted URL to the indicated primary data center.

4. The method of claim 3, wherein the adjusted URL includes a prefix related to the indicated primary data center.

5. The method of claim 1, wherein the user data is stored in the indicated primary data center.

6. The method of claim 5 wherein at least a portion of the user data is also stored in the secondary data center.

7. The method of claim 6, wherein receiving the user request data includes receiving the user request data at a lookup service module.

8. The method of claim 7, wherein providing the selection data includes providing the selection data from the lookup service module to the request routing system.

9. The method of claim 1, wherein the selection data includes index data that indicates the indicated primary data center.

10. The method of claim 1, further comprising causing the user request data to be routed to the secondary data center if the indicated primary data center is not available.

11. The method of claim 1, further comprising routing the user request data from the local traffic manager related to the secondary data center to the primary data center if the local traffic manager associated with the local traffic manager is not available.

12. The method of claim 1, wherein the plurality of data centers, the plurality of global traffic managers, and the plurality of local traffic managers are part of a financial system.

13. The method of claim 1, further comprising providing the user data from the indicated primary data center to the request routing system in response to the user request data.

14. The method of claim 1, further comprising providing the user data from the indicated primary data center to the user in response to the user request data.

15. The method of claim 1, wherein the user request data includes one or more of:
    a name of the user;
    an identification number of the user;
    a password of the user;
    a name of a company of the user;
    a company identification;
    an employment position of the user;
    an I.P. address of the user;
    a MAC address of a computing device of the user; or
    data indicating the user data to be accessed by the user.

16. The method of claim 1, wherein causing the user request data to be routed to the local traffic manager related to the indicated primary data center includes resolving, with the global traffic manager related to the indicated primary data center, an Internet protocol address.

17. The method of claim 16, wherein causing the user request data to be routed to the local traffic manager related to the indicated primary data center includes providing the Internet protocol address from the global traffic manager related to the indicated primary data center to the request routing system.

18. The method of claim 17, wherein providing the Internet protocol address to the routing request system causes the routing request system to route the user request data to the indicated primary data center.

19. A system for providing improved routing efficiency for a heterogeneous data management system, the system comprising:
- at least one processor; and
- at least one memory coupled to the at least one processor, the at least one memory having stored therein instructions which, when executed by the at least one processors, perform a process including:
    - receiving, with a lookup service module of a computing system, user request data from a request routing system, the user request data being related to a request of a user to access user data stored in one or more of a plurality of data centers, the user data being business or financial data of the user, each data center being coupled to its own respective global traffic manager of a plurality of global traffic managers and also coupled to its own respective local traffic manager of a plurality of local traffic managers;
    - retrieving, by the lookup service from an addressing database, addressing data indicating a primary data center having user data of the user;
    - generating, with the lookup service module, selection data based on the user request data, the selection data including the addressing data indicating a primary data center from the plurality of data centers, the indicated primary data center being a data center having the user data associated with the user request data;
    - providing, by the request routing system responsive to receiving the selection data, the user request data to the global traffic manager coupled to the indicated primary data center by providing, with the lookup service module, the selection data to the request routing system;
    - checking, with the global traffic manager related to the indicated primary data center, an availability of the local traffic manager coupled to the indicated primary data center;
    - if the local traffic manager coupled to the primary data center is available:
        - causing the user request data to be routed to the local traffic manager coupled to the indicated primary data center; and
    - if the local traffic manager coupled to the indicated primary data center is not available:
        - sending the user request data from the global traffic manager coupled to the indicated primary data center to a local traffic manager coupled to a secondary data center from the plurality of data centers.

20. The system of claim 19, wherein the user request data includes a URL.

21. The system of claim 20, wherein the selection data causes the request routing system to attach to the user request data an adjusted URL specific to the indicated primary data center.

22. The system of claim 21, wherein the adjusted URL includes a prefix related to the indicated primary data center.

23. The system of claim 19, wherein the user data is stored in the indicated primary data center.

24. The system of claim 23 wherein at least a portion of the user data is also stored in the secondary data center.

25. The system of claim 24, wherein receiving the user request data includes receiving the user request data at a lookup service module.

26. The system of claim 25, wherein providing the selection data includes providing the selection data from the lookup service module to the request routing system.

27. The system of claim 19, wherein the selection data includes index data that indicates the indicated primary data center.

28. The system of claim 19, wherein the process includes routing the user request data to the secondary data center if the indicated primary data center is not available.

29. The system of claim 19, wherein the process includes routing the user request data from the local traffic manager related to the secondary data center to the primary data center if the local traffic manager associated with the indicated primary data center is not available.

30. The system of claim 19, wherein the plurality of data centers, the plurality of global traffic managers, and the plurality of local traffic managers are part of a financial system.

31. The system of claim 19, wherein the process includes providing the user data from the indicated primary data center to the request routing system in response to the user request data.

32. The system of claim 19, wherein the process includes providing the user data from the indicated primary data center to the user in response to the user request data.

33. The system of claim 19, wherein the user request data includes one or more of:
- a name of the user;
- an identification number of the user;
- a password of the user;
- a name of a company of the user;
- an employment position of the user;
- an I.P. address of the user;
- a MAC address of a computing device of the user; or
- data indicating the user data to be accessed by the user.

34. The system of claim 19, wherein causing the user request data to be routed to the local traffic manager related to the indicated primary data center includes resolving, with the global traffic manager coupled to the indicated primary data center, an Internet protocol address.

35. The system of claim 34, wherein causing the user request data to be routed to the local traffic manager coupled to the indicated primary data center includes providing the Internet protocol address from the global traffic manager coupled to the indicated primary data center to the request routing system.

36. The method of claim 35, wherein providing the Internet protocol address to the routing request system causes the routing request system to route the user request data to the indicated primary data center.

* * * * *